United States Patent [19]

Fesman

[11] Patent Number: 4,514,524

[45] Date of Patent: Apr. 30, 1985

[54] INTUMESCENT FLEXIBLE POLYURETHANE FOAM

[75] Inventor: Gerald Fesman, Teaneck, N.J.

[73] Assignee: Stauffer Chemical Company, Westport, Conn.

[21] Appl. No.: 630,460

[22] Filed: Jul. 13, 1984

[51] Int. Cl.³ .............................................. C08G 18/14
[52] U.S. Cl. .................................... 521/107; 252/609; 521/114; 521/128; 521/131; 521/132; 521/136; 521/137; 524/145; 524/211; 524/212
[58] Field of Search ............... 521/107, 114, 128, 131, 521/132, 136, 137; 252/609; 524/145, 211, 212

[56] References Cited

U.S. PATENT DOCUMENTS

| | | | |
|---|---|---|---|
| 3,134,742 | 5/1964 | Wisman et al. | 521/107 |
| 3,135,707 | 6/1964 | Nyquist et al. | 521/107 |
| 4,122,049 | 10/1978 | Wagner | 521/136 |
| 4,130,697 | 12/1978 | Stern et al. | 521/107 |
| 4,139,501 | 2/1979 | Rudner et al. | 521/115 |
| 4,160,075 | 7/1979 | Golser | 521/158 |
| 4,374,207 | 2/1983 | Stone et al. | 521/107 |
| 4,433,071 | 2/1984 | Fesman | 521/107 |

*Primary Examiner*—Maurice J. Welsh
*Attorney, Agent, or Firm*—Hensley M. Flash

[57] ABSTRACT

Flexible, resilient, polyurethane foam having improved flame retardancy and intumescent properties is prepared from the reaction of polyether polyol with organic isocyanate and an additive combination comprising: (i) a polyester polyol, (ii) an halogenated flame retardant, and (iii) water or alcohol soluble urea-formaldehyde resin.

20 Claims, No Drawings

INTUMESCENT FLEXIBLE POLYURETHANE FOAM

BACKGROUND OF THE INVENTION

1. Field of the Invention

This invention relates to improvements in flexible, resilient, polyurethane foams, and in particular to improvements in the characteristics of such foams when subjected to fire.

2. Related Art

A primary objective of this invention is to provide polyurethane foams having significantly enhanced resistance to combustion even when they are exposed to an intense ignition source. Flexible, resilient, polyurethane foams are made by the reaction of polyol and organic polyisocyanates in the presence of one or more blowing agents, one or more surfactants and one or more catalysts.

Uses for these foams include carpet underlay, packaging, textile innerlining, mattresses, pillows, furniture paddings, cushions, automobile crash pads and sound and thermal insulation.

Polyurethane foams burn readily when ignited. Various flame retardant chemicals have been added to polyurethane foams including halogenated esters of phosphorus. This has resulted in some improvement in the flammability properties, the extent of burning after ignition by a low intensity source being reduced and the foams may even be made self-extinguishing to some degree in small scale laboratory tests. However, when combustion does occur the foam can melt and drip flaming embers which can ignite other flammable materials in the vicinity causing the fire to spread. Such so-called "self-extinguishing" foams are generally not resistant to ignition by anything other than a low intensity ignition source. Other additives have been added to polyurethane foams to aid in overcoming this problem and to render the finished foams intumescent, or capable of producing a char, once having been ignited. These foams develop less flaming, dripping embers during combustion and produce a char which can act as a thermal insulating barrier and thus slow or prevent the spread of the fire.

The use of specific amino resins and amino resin derivatives for inclusion in polyurethane foams has been described in the prior art. U.S. Pat. No. 3,134,742 employs a synergistic combination of flame retardant ingredients wherein one ingredient is the reaction product of an acidic phosphorus compound and an amino compound. U.S. Pat. No. 3,135,707 describes polyurethane foams derived from partially alkylated polymethylolmelamines. U.S. Pat. No. 4,122,049 describes a polyurethane forming process using sedimenting dispersions of aminoplast. U.S. Pat. No. 4,130,697 describes polyurethane foam systems wherein aminoplast precondensates are reacted with organic isocyanates. U.S. Pat. No. 4,160,075 describes foams prepared from a reaction product of aminoplast precondensates and organic isocyanates.

U.S. Pat. No. 4,139,501 discloses flexible, polyurethane foams having reduced tendency to form burning embers when ignited and burned, produced by incorporating into the foam-forming reaction mixture a melamine derivative wherein one or more hydrogen atoms have been replaced by hydroxymethyl and/or lower alkoxymethyl groups. An halogenated phosphorus ester can also be included in the reaction mixture of this patent.

U.S. Pat. No. 4,374,207 discloses flexible, resilient, polyurethane foam having improved flame retardancy and intumescent properties prepared from a reaction mixture comprising a polyether polyol, an organic polyisocyanate, a blowing agent, a surfactant, a catalyst, a flame retardant, and hydrated alumina. The hydrated alumina is predispersed in a mixture comprising the flame retardant and a low-viscosity linear polyester and, alternatively, a char former and a fugitive viscosity modifier.

A process for preparing flexible, polyurethane foams having reduced tendency to form burning embers when ignited and burned would be advantageous. Flexible, polyether urethane foams are better for many applications, for example furniture cushioning, than polyester urethane foams. The dry-char flexible, polyester urethane foams cannot be used where high-resiliency cushioning is required. Therefore, users would prefer a dry-char property for polyether foams which can satisfy certain flammability classifications, for example Underwriter's Laboratories UL-94 HF-1 classification. There is also concern about the resiliency of polyurethane cushioning foam incorporating polyester resins. Polyester foams are poorer in resiliency, an important factor for comfort cushioning.

It would be advantageous to prepare a flexible, polyether urethane foam capable of meeting UL-94 HF-1 flammability classifications. It would be even more advantageous to formulate a flexible foam meeting the above classification and that is high in resiliency.

Other objects and advantages of the present invention are shown throughout this specification.

SUMMARY OF THE INVENTION

In accordance with the present invention, an improved flexible, resilient, polyether polyurethane foam with char-forming, or intumescent, properties, and a method of making such a foam has now been discovered. The process for preparing a flexible, resilient, flame-retardant and intumescent polyurethane foam by the reaction of a polyether polyol and an organic polyisocyanate comprises: adding to the polyurethane forming reactants at least one blowing agent, at least one surfactant, at least one catalyst and a flame and dripping ember retardant effective amount of an additive combination comprising: (i) a polyester polyol, (ii) a halogenated flame retardant, and (iii) water or alcohol soluble urea-formaldehyde resin.

This invention further comprises a composition for enhancing the flame retardance and dripping ember retardance of polyurethane foams which comprises: (i) a polyester polyol, (ii) an halogenated flame retardant, and (iii) water or alcohol soluble ureaformaldehyde resin.

DETAILED DESCRIPTION OF THE INVENTION

The process of this invention can be practiced by conventional polyurethane flexible, foam-forming technology. Polyurethane foams, according to this invention, having a density of from about 16 to about 48 kilograms per cubic meter are prepared by known methods, such as the prepolymer, quasi-polymer, or one shot systems. Foams can be prepared by batch or continuous processes. The foam-forming mixtures should include as basic ingredients: (A) polyether polyol, (B)

organic isocyanate, (C) blowing agent, (D) polyurethane catalyst, (E) surfactant, and (F) a combination of a polyester polyol, a halogenated flame retardant additive, and water or alcohol soluble urea-formaldehyde resin additive.

The polyether polyol ingredient (A) for the polyurethane foam formulation of this invention can be selected from any of the wide variety of polyhydric polyether compounds available and conventionally used by the art for the preparation of flexible ether-type polyurethane foams. The most common polyether polyol compounds, the polyoxyalkylene polyether polyols, are generally prepared by the reaction of an alkylene oxide, such as 1,2-propylene oxide, with a polyhydric initiator or starter. The polyhydric initiator or starter can be, for example, glycerol, trimethylolethane, trimethylolpropane, triethanolamine or a polyethylene glycol.

The alkylene oxides used in preparing the polyethers preferably are those which contain from 2 to 4 carbon atoms, for example ethylene oxide, 1,2-propylene oxide, 1,2-butylene oxide, trimethylene oxide and tetramethylene oxide. Also useful are the poly-(aralkylene ether) polyols which are derived from the corresponding aralkylene oxides such as, for example, styrene oxide, alone or mixed with an alkylene oxide. Generally, propylene oxide, that is, the 1,2-propylene oxide, and mixtures of 1,2-propylene oxide with ethylene oxide, are preferred for the preparation of the polyether polyol reactant. Also useful as polyols in the practice of this invention are the so-called graft polymers, that is polyether polyols which have been modified with acrylonitrile and/or styrene in such a way that some is grafted onto the backbone of the polyether polyol (but not on the functional, hydroxyl group) and some is present as a polymer dispersed in the polyol.

The polyethers for use in the present invention preferably have molecular weights of from about 2000 to about 6000 and optimally from about 3000 to about 4500 and an average hydroxy functionality of from about 2 to about 3. An example of a commercially available polyether is Niax ® 16-56 brand polyether polyol, a product of Union Carbide Corporation.

The organic polyisocyanate ingredient (B) of the foam-forming process can be selected from conventional isocyanates used for such purposes. Preferably the isocyanate has an isocyanate functionality of from 2 to 3. Useful isocyanates include aromatic, aliphatic, cycloaliphatic, heterocyclic types and mixtures thereof. Suitable organic isocyanates include toluene diisocyanate and phenylene diisocyanates, with toluene diisocyanate being preferred because of cost and availability.

The blowing agent (C) ingredient can comprise water alone or water in combination with other conventional blowing agents, such as methylene chloride, or hydrocarbons or fluorocarbons having a boiling point from about −30° C. to 60° C.

The polyurethane catalyst ingredient (D) is selected from materials conventional for such purpose. Suitable catalysts include amines such as tertiary amines and metal compounds such as stannous octoate, dibutyltin dilaurate, etc.

The surfactant ingredient (E) employed in the process of the invention can be selected from surfactants conventionally used for such purposes. Although a variety of surfactants are operative in the process of this invention, it has been found that a particularly desirable uniform cell structure and appearance is given to the foam if a silicone surfactant is used, e.g., Union Carbide Corporation TM L5810 and L5740 non-hydrolyzable silicone surfactants.

The flame and dripping ember retardant additive combination (F) of this invention comprises a polyester polyol, an halogenated flame retardant, and water or alcohol soluble uncrosslinked urea-formaldehyde resin.

The polyester polyol ingredient of additive (F) can be selected from one or a mixture of polyols conventionally used for the preparation of flexible polyurethane foams. Polyester polyols suitable for the preparations of these flexible polyurethane foams typically have a molecular weight between 500 and 5000 and hydroxyl number of from about 15 to about 150. Suitable polyols include the linear polymeric polyesters prepared from glycols and saturated polycarboxylic acids. For example, difunctional polyester polyols can be prepared by the reaction of diethylene glycol with adipic acid. A particularly preferred polyester polyol is Witco's Fomrez 53 ®.

The halogenated flame retardant ingredient used in the process and foam of the invention can be selected from conventional polyurethane flame retardant agents. The term, "halogenated flame retardant" as used in the context of this invention includes halogenated hydrocarbons and halogenated organophosphorus compounds.

Suitable halogenated flame retardants are, for example, tris(1,3-dichloropropyl)phosphate, tris(2,3-dibromopropyl)phosphate, dichloromethylene-bis(di-2-chloroethyl)phosphate, tris(2-chloroethyl)phosphate, tris(2-chloropropyl)phosphate, 2,2-bis-(chloromethyl)-1,3 propylene, bis-di(2-chloroethyl)phosphate, bis(dichloropropyl)tribromoneopentyl phosphate, tetrakis(2-chloroethyl)ethylene diphosphate, pentabromodiphenyl oxide, bis(pentabromophenoxy)ethane, bis(tetrabromophthalimide)ethane, tetrabromobisphenol A, hexabromocyclododecane, bis(tribromophenoxy)ethane, octabromodiphenyl oxide, tribromoneopentyl alcohol, chlorinated paraffin, brominated paraffin, and mixtures thereof.

The amino resin ingredient of this invention is a liquid water or alcohol soluble uncrosslinked (non-thermoset) urea-formaldehyde or urea-formaldehyde derivative precondensate resin which is unreactive with the organic isocyanate (under foam-forming conditions). The term "water or alcohol soluble urea-formadehyde resin" is used in this specification to describe this essential ingredient. Preferred urea-formaldehyde resins for this invention are the butylated and the methylated urea-formaldehyde resins such as BEETLE ® 80 and BEETLE ® 65 resins, products of American Cyanamid Company.

The amount of flame and dripping ember retardant additive combination used in the foam is an amount effective to give the combined reduction of flame retardant and dripping embers properties desired by the user. A useful standard for determining suitable levels of additive is the Underwriters' Laboratories UL-94 test. Urethane foam samples passing the HF-1 standard of the UL-94 test are considered to contain effective levels of additive for the purpose of this invention.

The combined weight of the additive combination is typically from about 40 to about 50 weight percent of the total weight of the foam formulation ingredients or of the final flexible polyurethane foam product. The ratio of polyester polyol to halogenated flame retardant to water or alcohol soluble urea-formaldehyde resin is from about 5:4:1 to about 7.5:1.5:1.

The additive combination of this invention can be a premixed storage-stable composition of matter suitable for addition to a foam-forming reaction system to impart enhanced flame retardance and dripping ember retardance to a flexible, resilient, polyurethane foam product. The essential ingredients of this additive combination comprises a polyester polyol, an halogenated flame retardant, and water or alcohol soluble uncrosslinked urea-formaldehyde resin. However, a variety of optional ingredients may be added to the additive combination. For example, the combination can include the polyether polyol. Other optional ingredients can be selected from solvents, diluents, colorants, stabilizers, cell openers, lubricants, biocides, etc. The isocyanate foam reactant cannot be included.

The additive combination can be used by mixing it in any order with the polyurethane foam-forming ingredients either prior to or at the time of reaction.

The individual ingredients comprising the additive combination can be individually metered into the foam formulation as in the "one shot" method.

The following examples describe various embodiments of the invention. Other embodiments will be apparent to the skilled in the art from a consideration of this specification or practice of the invention disclosed herein. It is intended that the specification and examples be considered as exemplary only, with the true scope and spirit of the invention being indicated by the claims which follow the examples.

EXAMPLES 1-6

These examples describe the batch preparation of flexible polyurethane foams by the "one shot" method. The ingredients used and the test results are set out in Table I.

was added to a mixture of the other ingredients in the formulation. The resulting foams were tested for flammability using the UL 94 method (Underwriters' Laboratories, Inc. UL 94 "Test for Flammability of Plastic Materials for Parts in Devices and Appliances", Feb. 1, 1974).

The foams of Examples 1-3 that were prepared without the BEETLE ® 80 resin exhibited an inferior combination of burn distance, burn time, dripping ember and cotton ignition properties compared with the foams of Examples 5 and 6 which were prepared using the additive combination of ingredients according to the practice of this invention. Only the foams of Examples 5 and 6 passed the 94 HF-1 burning test classification.

The foam of Example 4, although containing the additive combination, did not pass the 94 HF-1 burning-test classification. When the foam of Example 4 is compared with the foams of Examples 5 and 6, it is noted that a lower level of polyester polyol is used.

EXAMPLE 7

Flexible polyester urethane foams are normally poorer than polyether foams for seat cushioning applications primarily due to their poorer resilience as measured by the Ball Rebound Test (ASTM D-3574-81).

In this invention, it was found that despite the incorporation of 50% polyester resin in the total polyol content, the resilience of the resultant foam was similar to the resilience of a foam cushion made with 100% polyether polyol. In this comparison, densities of the foams were equivalent at 1.75 lbs/cu ft (28 Kg/cu meter).

Table II below illustrates this by comparing all polyether, 50/50 polyester-polyether blend and all polyester urethane foams.

TABLE I

| Basic Ingredients | Examples - Parts by Weight | | | | | |
|---|---|---|---|---|---|---|
|  | 1 | 2 | 3 | 4 | 5 | 6 |
| Niax 16-56 polyether polyol - sold by Union Carbide Corp. | 75 | 50 | 25 | 75 | 50 | 50 |
| 80/20 Toluene diisocyanate | 51 | 51 | 51 | 51 | 51 | 51 |
| L-5740 Silicone - sold by Union Carbide Corp. | 1.4 | 1.4 | 1.4 | 1.4 | 1.4 | 1.4 |
| N—ethylmorpholine | 1.3 | 1.3 | 1.8 | 1.3 | 1.8 | 2.0 |
| T-10 (50% stannous octoate - sold by M and T Chemicals) | 0.42 | 0.30 | 0.11 | 0.33 | 0.42 | 0.42 |
| Methylene Chloride | 1.50 | 1.50 | 1.50 | 1.5 | 1.5 | 1.5 |
| Water | 3.85 | 3.85 | 3.85 | 3.85 | 3.85 | 3.85 |
| Additives |  |  |  |  |  |  |
| Fomrez 53 ® brand polyester polyol resin, derived from diethylene glycol and adipic acid plus crosslinking agent | 25 | 50 | 75 | 25 | 50 | 50 |
| Fyrol ® FR-2 flame retardant, product of Stauffer Chemical Co., tri(1,3-dichloropropyl)-phosphate | 20 | 20 | 20 | 20 | 20 | — |
| Fyrol ® EFF flame retardant, product of Stauffer Chemical Co. | — | — | — | — | — | 15 |
| Beetle ® 80 brand of butylated urea-formaldehyde resin, product of American Cyanamid Co. | — | — | — | 10 | 10 | 10 |
| Results |  |  |  |  |  |  |
| UL 94 Burn Distance, Inches (Total) | 4.5 | 4.0 | 3.8 | 2.6 | 1.8 | 1.8 |
| UL 94 Burn Time Secs | 50 | 40 | 30 | 17 | 0 | 0 |
| Flaming, dripping embers | YES | YES | YES | YES | NO | NO |
| Cotton ignition from embers | YES | YES | YES | YES | NO | NO |
| UL 94 Rating | — | — | — | — | HF-1 | HF-1 |

The foams of Examples 1-6 were each prepared by the same method. The toluene diisocyanate ingredient

TABLE II

| Ratio of Polyester Resin/ Polyether Polyol | % Resilience (ASTM D-3574-81 Ball Rebound Test) |
| --- | --- |
| 100% polyether polyol | 55 |
| *50% polyether polyol/50% polyester resin | 45 |
| 100% polyester resin | 25 |

*Formulation of Example 5 above.

What is claimed is:

1. In a process for preparing a flexible, resilient, flame retardant and intumescent polyurethane foam by the reaction of a polyether polyol and an organic polyisocyanate wherein the improvement comprises:
    adding to the polyurethane forming reactants at least one blowing agent, at least one surfactant, at least one catalyst and a flame and dripping ember retardant effective amount of an additive combination comprising:
    i. a polyester polyol,
    ii. an halogenated flame retardant, and
    iii. water or alcohol soluble uncrosslinked urea-formaldehyde resin which is unreactive with said organic polyisocyanate.

2. The process of claim 1 wherein the halogenated flame retardant is selected from the group consisting of tris(1,3-dichloropropyl)phosphate, tris(2,3-dibromopropyl)phosphate, dichloromethylene-bis(di-2-chloroethyl)phosphate, tris(2-chloroethyl)phosphate, tris(2-chloropropyl)phosphate, 2,2-bis-(chloromethyl)-1,3 propylene, bis-di(2-chloroethyl)phosphate, bis(dichloropropyl)tribromoneopentylphosphate, tetrakis(2-chloroethyl)ethylene diphosphate, pentabromodiphenyl oxide, bis(pentabromophenoxy)ethane, bis(tetrabromophthalimide)ethane, tetrabromobisphenol A, hexabromocyclododecane, bis(tribromophenoxy)ethane, octabromodiphenyl oxide, tribromoneopentyl alcohol, chlorinated paraffin, brominated paraffin, and mixtures thereof.

3. The process of claim 1 wherein the combined weight of said additive combination is from about 40 to about 50 weight percent of the total weight of the reaction mixture.

4. The process of claim 1 wherein the weight ratio of said polyester polyol to said halogenated flame retardant to said urea-formaldehyde resin is from about 5:4:1 to about 7.5:1.5:1.

5. The process of claim 1 wherein the weight ratio of said polyether polyol to said polyester polyol is from about 1:3 to about 1:1.

6. The process of claim 1 wherein the resin is a butylated urea-formaldehyde resin.

7. The process of claim 1 wherein the resin is a methylated urea-formaldehyde resin.

8. A flexible polyurethane foam prepared from polyether polyol and organic isocyanate which contains a flame and dripping ember retardant effective amount of
    i. a polyester polyol,
    ii. an halogenated flame retardant, and
    iii. water or alcohol soluble uncrosslinked urea-formaldehyde resin which is unreactive with said organic isocyanate.

9. The foam of claim 8 wherein the halogenated flame retardant is selected from the group consisting of tris (1,3-dichloropropyl)phosphate, tris(2,3-dibromopropyl)phosphate, dichloromethylene-bis(di-2-chloroethyl)phosphate, tris(2-chloroethyl)phosphate, tris(2-chloropropyl)phosphate, 2,2-bis(chloromethyl)-1,3 propylene, bis-di(2-chloroethyl)-phosphate, bis(dichloropropyl)tribromoneopentylphosphate, tetrakis(2-chloroethyl)ethylene diphosphate, pentabromodiphenyl oxide, bis(pentabromophenoxy)ethane, bis(tetrabromophthalimide)ethane, tetrabromo-bisphenol A, hexabromocyclodedecane, bis(tribromophenoxy)ethane, octabromodiphenyl oxide, tribromoneopentyl alcohol, chlorinated paraffin, brominated paraffin, and mixtures thereof.

10. The foam of claim 8 wherein the combined weight of said polyester polyol, said halogenated flame retardant and said urea-formaldehyde resin is from about 40 to about 50 weight percent of the total weight of the foam.

11. The foam of claim 10 wherein the weight ratio of said polyester polyol to said halogenated flame retardant to said urea-formaldehyde resin is from about 5:4:1 to about 7.5:1.5:1.

12. The foam of claim 8 wherein the resin is a butylated urea-formaldehyde resin.

13. The foam of claim 8 wherein the resin is a methylated urea-formaldehyde resin.

14. The foam of claim 8 wherein the weight ratio of said polyether polyol to said polyester polyol is from about 1:3 to about 1:1.

15. A composition for enhancing the flame retardance and dripping ember retardance of polyether urethane foams which comprises:
    i. a polyester polyol,
    ii. an halogenated flame retardant, and
    iii. water or alcohol soluble urea-formaldehyde resin.

16. The composition of claim 15 wherein the halogenated flame retardant is selected from the group consisting of tris(1,3-dichlorpropyl)phosphate, tris(2,3-dibromopropyl)phosphate, dichloromethylene-bis(di-2-chloroethyl)phosphate, tris(2-chloroethyl)phosphate, tris(2-chloropropyl)phosphate, 2,2-bis(chloromethyl)-1,3 propylene, bis-di(2-chloroethyl)phosphate, bis(dichloropropyl)tribromoneopentyl)phosphate, tetrakis(2-chloroethyl)ethylene diphosphate, pentabromodiphenyl oxide, bis(pentabromophenoxy)ethane, bis(tetrabromophthalimide)ethane, tetrabromobisphenol A, hexabromocyclododecane, bis(tribromophenoxy)ethane, octabromodiphenyl oxide, tribromoneopentyl alcohol, chlorinated paraffin, brominated paraffin, and mixtures thereof.

17. The composition of claim 15 wherein the weight ratio of said polyester polyol to said halogenated flame retardant to said urea-formaldehyde resin is from about 5:4:1 to about 7.5:1.5:1.

18. The composition of claim 15 wherein the weight ratio of said polyether polyol to said polyester polyol is from about 1:3 to about 1:1.

19. The composition of claim 15 wherein the resin is a butylated urea-formaldehyde resin.

20. The composition of claim 15 wherein the resin is a methylated urea-formaldehyde resin.

* * * * *